(No Model.)

T. J. TIMMONS.
VEHICLE BRAKE.

No. 380,365. Patented Apr. 3, 1888.

Witnesses
Thos. Houghton.
Katie Parkhurst.

Inventor,
Thomas J. Timmons.
By his Attorney,
John S. Duffie.

UNITED STATES PATENT OFFICE.

THOMAS J. TIMMONS, OF GODWIN, TENNESSEE.

VEHICLE-BRAKE.

SPECIFICATION forming part of Letters Patent No. 380,365, dated April 3, 1888.

Application filed September 30, 1887. Serial No. 251,116. (No model.)

*To all whom it may concern:*

Be it known that I, THOMAS J. TIMMONS, a citizen of the United States, residing at Godwin, in the county of Maury and State of Tennessee, have invented certain new and useful Improvements in Buggy-Brakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to buggy-brakes; and it consists in the novel construction and arrangement of its parts.

Figure 1:
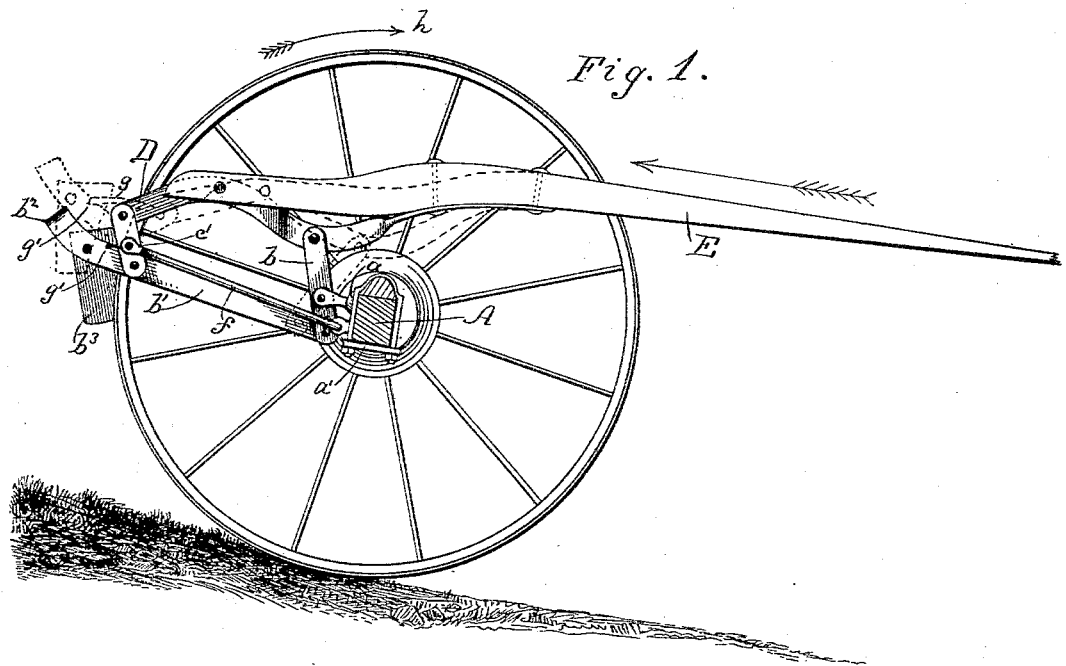
Figure 2:
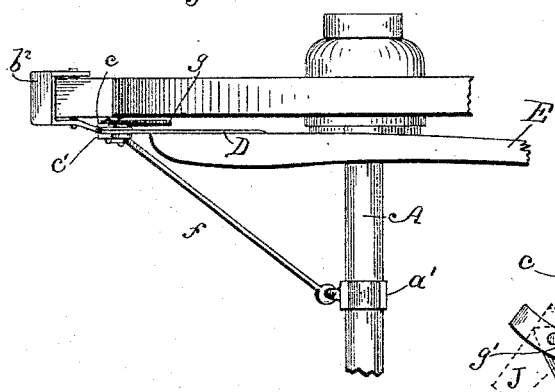
Figure 3:
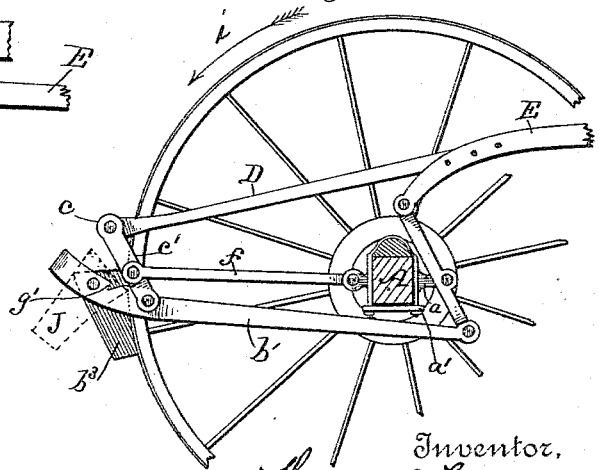

In the accompanying drawings, Figure 1 is an elevation showing one side of the invention and the end of the axle cut off. Fig. 2 is a top plan view of Fig. 1. Fig. 3 is an elevation showing the invention with the lever in front of the axle instead of in rear of it.

My invention is intended to be attached to shafts of buggies or like vehicles, and to the axle of the same, and may be applied not only to buggies but to other vehicles to which shafts are used.

In constructing new buggies or like vehicles I would adopt a shaft and an iron strap united to the invention, as shown in Fig. 1; but in applying the invention to buggies or like vehicles already in use I would prefer to put the actuating-lever in front of the axle and attach the shaft to the upper end of the same and attach rods to the shafts running back and connecting with the rear straps, as shown in Fig. 3. However, it is possible to connect the shafts to the actuating-lever in rear of the axle, but it would have the effect of making the shafts a little short; but to overcome this I could lengthen the shafts by rigidly securing to their rear ends straps to connect with the actuating-lever.

My invention is described as follows: To the axle A, I secure clips $a$ $a'$, $a$ being near the ends of the axle and $a'$ near the center of the same. In each of the sockets of the clips $a$, I pivot a lever, $b$, at or near its center. In the lower end of said levers $b$, I pivot draw-bars $b'$, the rear ends of which are curved round so as to form U-shaped sockets $b^2$, in which are pivoted the rub-blocks $b^3$, immediately in rear of the front wheels, so that they may be made to press against the tires of the same and lock the wheels. Near the rear ends of the said draw-bars $b'$ and a little in front of the rub-blocks $b^3$ are pivoted straps $c$ $c'$. These straps are pivoted to said draw-bars at their lower ends, and one on either side of said draw-bars and extending upwardly; and between their upper ends are pivoted straps D, which run forward until they come in contact with the rear end of the shaft E, to which they are securely bolted. Then they bend down and are pivoted to the upper ends of the lever $b$, and then are turned up while running forward, and are again securely bolted to the said shafts. This particular form of strap, however, is not essential. It is sufficient that the straps be securely bolted to the said shafts and having means for pivoting to them the said levers $b$ and the straps $c$ $c'$. In the sockets of the clips $a'$ are pivoted or otherwise secured braces $f$, the rear ends of which are carried back and pivoted to the straps $c$ $c'$ at or near their center. The purpose of these braces $f$ is to hold the said draw-bars out and keep the rub-block $b^3$ immediately in rear of the front wheels, and also to form a pivotal bearing for said straps $c$ $c'$; and it is important that the pivotal points of the levers $b$ shall have the same relation to the pivotal points of the straps $c$ $c'$, in order to make the contrivance operate well—that is to say, if the pivotal points in the levers $b$ are at their centers, the pivotal points in the straps $c$ $c'$ should be at their centers; but if the pivotal points of the said levers are one-fourth the distance from the lower ends the pivotal points of the said straps should be one-fourth the distance from their lower ends, and so on. To the rear ends of said straps D are hinged or pivoted ratchets $g$, which are adapted to catch in the ratchet-notches $g'$ near the rear ends of said straps D. The purpose of said ratchets $g$ is to lock the said brakes, so as to keep them from running up against the wheels when not desirable—for instance, in going down a long incline, where the horse would sometimes be required to hold back a little, or where it became necessary to back the buggy or other vehicle.

These ratchets are intended to lie back out of the way on the straps D when not in use. As the setting of these ratchets in the notches would be attended with some little trouble, I provide and claim the right to manufacture the invention without using them, if I desire; and, as I have said, as the setting of these ratchets would be attended with some little trouble, I have so constructed and arranged the draw-bars $b'$ and the rub-blocks $b^3$ in connection with the other parts of my invention that I can back the buggy without the use of the said ratchets, because the said rub-blocks are pivoted nearer their upper ends and outer faces than to their inner faces, leaving their lower ends to hang a considerable distance below the draw-bars $b'$, so that when the buggy is moving forward and the wheels are running forward in the direction indicated by the arrow $h$, Fig. 1, the periphery of the wheels bears against the front faces of said rub-blocks, and as their lower ends extend so far down below the said draw-bars they cannot possibly turn, and the wheels are therefore securely locked by means of the operation of the said shafts E, straps D, levers $b$, draw-bars $b'$, and the said rub-blocks; but when I back the buggy, as the wheels are turning backward in the direction of the arrow $i$, the tires of the said wheel catch the upper and inner corners of the said rub-blocks and throw the lower ends outward, as indicated by the dotted lines $j$, Fig. 3; and, as it will be seen that the distance from the pivotal point of said rub-blocks is much greater from said pivotal point to their front faces than to the upper ends of the same, the said upper ends of said rub-blocks will not impinge the said wheels, and thus allow them to turn backward freely. The said blocks are made V-shaped, not running entirely, however, to a sharp point at their lower ends, and their front faces are adapted and shaped to fit the circumference of the wheels. Their pivotal point is very near their upper end and very near their upper outside corner, so that when the wheel turns back it will catch the upper inner corner of the said rub-blocks and throw the lower ends of the same out, thus leaving the said wheels free to run backward.

Having described my invention, what I claim as new, and desire to secure by Letters Patent, is—

1. In combination with the front running-gear of a vehicle drawn by shafts, the combination of the clips $a\ a'$, secured to the axle A, levers $b$, pivoted in clips $a$, draw-bars $b'$, their front ends pivoted to the lower end of the lever $b$, their rear ends pivoted to the lower ends of the straps $c\ c'$, straps $c\ c'$, pivoted to said bars at their lower ends, straps D, pivoted in the upper ends of said straps $c\ c'$ and to levers $b$, braces $f$, their front ends secured to the clips $a'$ and their rear ends pivoted to the straps $c\ c'$, and rub-blocks $b^3$, pivoted in the rear ends of said draw-bars $b'$, substantially as shown and described, and for the purposes set forth.

2. In combination with the front running-gear of a vehicle drawn by shafts, the combination of the clips $a\ a'$, secured to the axle A, levers $b$, pivoted in clips $a$, draw-bars $b'$, their front ends pivoted to the lower end of the lever $b$, their rear ends pivoted to the lower ends of the straps $c\ c'$, straps $c\ c'$, pivoted to said bars at their lower ends, straps D, pivoted in the upper ends of said straps $c\ c'$ and to levers $b$, braces $f$, their front ends secured to the clips $a'$ and their rear ends pivoted to the straps $c\ c'$, rub-blocks $b^3$, pivoted in the rear ends of said draw-bars $b'$, and ratchets $g$, hinged or pivoted to straps D and adapted to catch in the ratchet-notches $g'$ in the rear ends of said draw-bars, substantially as shown and described, and for the purposes set forth.

3. In a buggy-brake, substantially as above described, in combination with the shafts E, straps D, levers $b$, straps $c\ c'$, and draw-bars $b'$, rub-blocks $b^3$, said rub-blocks being wedge-shaped, their inner face adapted to the circumference of the buggy-wheels, their pivotal point being near their upper ends and outer corners, so that when the wheels turn back the lower end of said rub-blocks will fly back, thus leaving the wheel free to move backward, substantially as shown and described, and for the purposes set forth.

In testimony whereof I affix my signature in presence of two witnesses.

THOS. J. TIMMONS.

Witnesses:
LEON. FRIERSON,
WM. A. ALEXANDER.